United States Patent [19]

Toyama

[11] Patent Number: 5,679,942
[45] Date of Patent: Oct. 21, 1997

[54] MAGNETIC CARD READER USING TWO MULTI CHANNEL MAGNETIC HEADS THAT CAN READ MAGNETIC TRACK DATA IN TWO SEPARATE AND DISTINCT DIRECTIONS

[75] Inventor: Akira Toyama, Nagano, Japan

[73] Assignee: Kabushiki Kaisha Sankyo Seiki Seisakusho, Nagano, Japan

[21] Appl. No.: 296,437

[22] Filed: Aug. 26, 1994

[30] Foreign Application Priority Data

Aug. 27, 1993 [JP] Japan .................................... 5-212752

[51] Int. Cl.$^6$ ..................................................... G06K 7/08
[52] U.S. Cl. ............................ 235/449; 235/440; 235/493
[58] Field of Search ............................... 235/440, 449, 235/480, 493

[56] References Cited

U.S. PATENT DOCUMENTS

| | | | |
|---|---|---|---|
| 3,873,975 | 3/1975 | Miklos | 235/449 |
| 4,634,848 | 1/1987 | Shinohara | 235/449 |
| 5,054,092 | 10/1991 | LaCaze | 382/11 |
| 5,179,272 | 1/1993 | Ono | 235/476 |
| 5,291,005 | 3/1994 | Ishii | 235/449 |

FOREIGN PATENT DOCUMENTS

| | | |
|---|---|---|
| 2659767 | 9/1991 | France . |
| 4521736 | 7/1970 | Japan . |
| 4841565 | 12/1973 | Japan . |
| 563830 | 1/1981 | Japan . |
| 5858730 | 12/1983 | Japan . |
| 2141915 | 5/1990 | Japan . |
| 2281468 | 11/1990 | Japan . |
| 1101978 | 2/1968 | United Kingdom . |
| WO 9104549 | 4/1991 | WIPO . |

OTHER PUBLICATIONS

Magnetic Card Reader, Patent Abstracts of Japan, JP 58–66170, vol. 7, No. 156, Apr. 20, 1983.
Magnetic Card Reading Device, Patent Abstracts of Japan, JP 60167162, vol. 10, No. 12, Aug. 30, 1985.
English language summary for JP-A-2-281468, Nov. 1990.

Primary Examiner—Donald T. Hajec
Assistant Examiner—Karl Frech
Attorney, Agent, or Firm—Sughrue, Mion, Zinn, Macpeak, and Seas.

[57] ABSTRACT

A magnetic card reader includes a first multi-channel magnetic head for reading signals from a magnetic card which inserted in a first direction, a second multi-channel magnetic head for reading signals from a magnetic head which is inserted in a second direction, a plurality of switching circuits for delivering signals supplied from the first multi-channel magnetic head and the second multi-channel magnetic head at respective channels thereof after switching each set of common channels of the first and second multi-channel magnetic heads, a plurality of amplifier circuits for amplifying output signals from the plurality of switching circuits, respectively, and a decision circuit for determining the direction of insertion of the magnetic cards on the basis of the output signals from the switching circuits and for selectively operating the switching circuits so as to deliver output signals associated with the direction of insertion of the magnetic cards.

18 Claims, 5 Drawing Sheets

FIG. 6

| EXISTENCE OF CARD DIRECTION OF INSERTION | INPUT | | INTERMEDIATE POINTS | | | | | OUTPUT | |
|---|---|---|---|---|---|---|---|---|---|
| | C | D | a | b | c | d | e | A | B |
| NO CARD | L | L | H | H | L | L | H | H | L |
| FORWARD INSERTION | H | L | L | H | H | L | H | H | H |
| REVERSE INSERTION | L | H | H | L | H | H | L | L | L |

MAGNETIC CARD READER USING TWO MULTI CHANNEL MAGNETIC HEADS THAT CAN READ MAGNETIC TRACK DATA IN TWO SEPARATE AND DISTINCT DIRECTIONS

BACKGROUND OF THE INVENTION

1. Field of the Invention

The present invention relates to a magnetic card reader that is capable of reproducing signals from magnetic cards irrespective of whether they were inserted in a forward or a reverse direction.

2. Related Art

Magnetic card readers are designed to reproduce signals as they are read from telephone cards, credit cards and other magnetic cards that have been inserted by users. One of the problems with conventional magnetic card readers is that they will not function properly if the user inserts his magnetic card in the wrong direction. An improved magnetic card reader which is capable of proper functioning irrespective of the direction in which magnetic cards are inserted is described in Unexamined Published Japanese Patent Application Hei 2-141915; the reader has four magnetic heads, the first head for reading signals from a magnetic card that is inserted in a forward direction, the second head for reading signals from a magnetic card that is inserted in a reverse direction, the third head for reading signals from a magnetic card that is turned upside down and inserted in a forward direction, and the fourth head for reading signals from a magnetic card that is turned upside down and inserted in a reverse direction, and the signals as read by and supplied from the four magnetic cards are respectively processed by associated amplifier circuits.

Examined Japanese Utility Model Publication Sho 56-3830 teaches a magnetic card detector in which the contents of magnetic cards are read with four magnetic heads and in which the signals thus read are amplified with four amplifiers, shaped into rectangular waves by wave shaping circuits and then passed through charge-up circuits before comparison with a reference voltage in comparator circuits.

The card readers described above require four magnetic heads and four amplifier circuits, so they suffer from the disadvantage of increased circuit size. Furthermore, users will seldom fail to identify the reverse side of magnetic cards, so the third and fourth magnetic heads for reading signals from magnetic cards that have been inserted upside down, as well as the amplifier circuits for amplifying the signals read by and supplied from these magnetic heads, are simply superfluous.

SUMMARY OF THE INVENTION

An object of the present invention is to eliminate these problems and provide a magnetic card reader that is simple in circuit configuration and which yet is capable of proper functioning irrespective of whether magnetic cards are inserted in a forward or reverse direction.

According to an aspect of the present invention, a magnetic card reader is provided which (1) has a first multi-channel magnetic head for reading signals from a magnetic card that is inserted in a forward direction, (2) has a second multi-channel magnetic head for reading signals from a magnetic head that is inserted in a reverse direction, (3) is capable of reproducing the signals from the magnetic cards irrespective of the direction in which they were inserted. The card reader is characterized by further including a plurality of switching circuits with which the signals for the respective channels as read by and supplied from the first multi-channel magnetic head and the second multi-channel magnetic head are delivered after being switched for each set of common channels. A plurality of amplifier circuits amplify the respective output signals from the plurality of switching circuits. A decision circuit that determines the direction of insertion of the magnetic cards on the basis of the output signals from the switching circuits, operates the switching circuits so as to deliver output signals associated with the direction of insertion of the magnetic cards. Having these features, the reader is simple in circuit configuration and yet it is capable of proper functioning irrespective of whether magnetic cards are inserted in a forward or reverse direction.

BRIEF DESCRIPTION OF THE DRAWINGS

FIG. 6 is a table showing signal levels that develop at various points of FIG. 4 in selected situations.

DETAILED DESCRIPTION OF THE PREFERRED EMBODIMENTS

Figure 1:
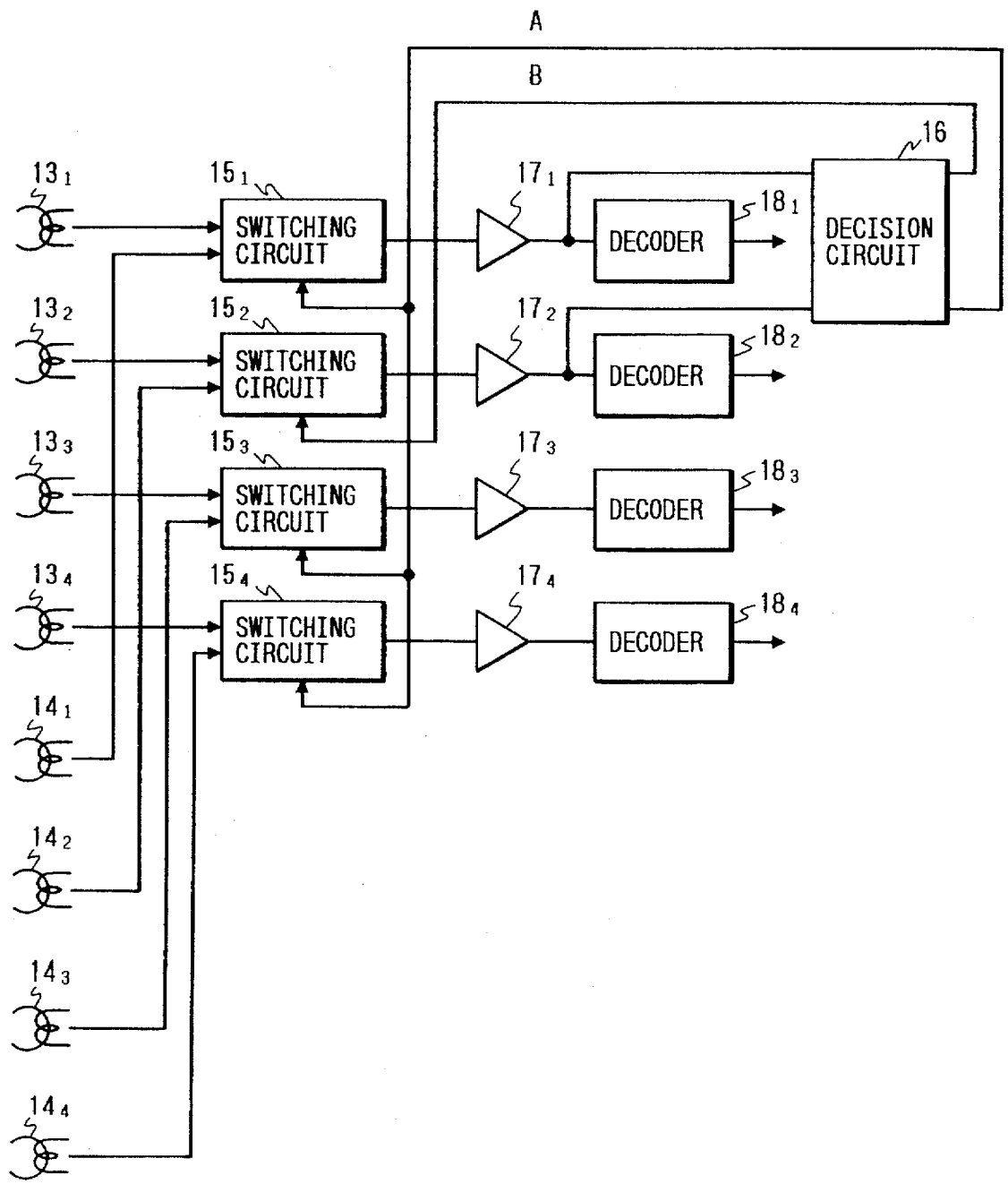
FIG. 1 is a block diagram showing a magnetic card reader according to an embodiment of the present invention.
Figure 2:
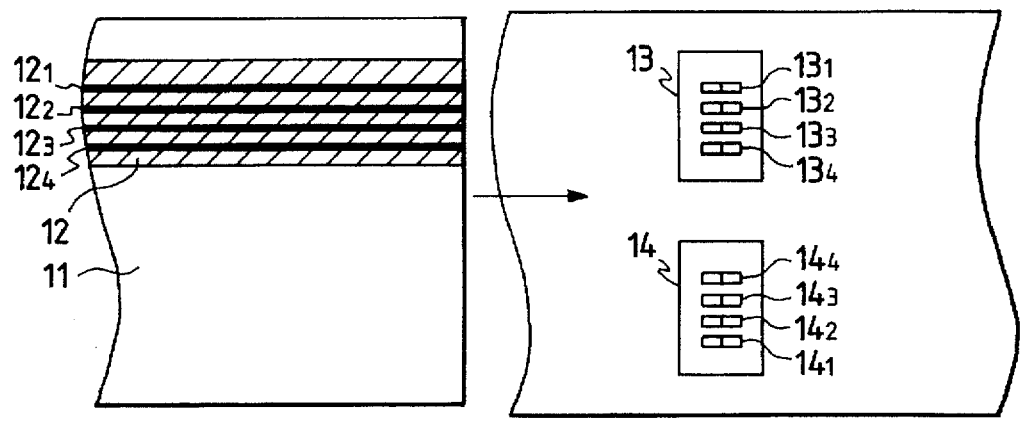
FIG. 2 is a plan view showing part of that reader.
Figure 4:
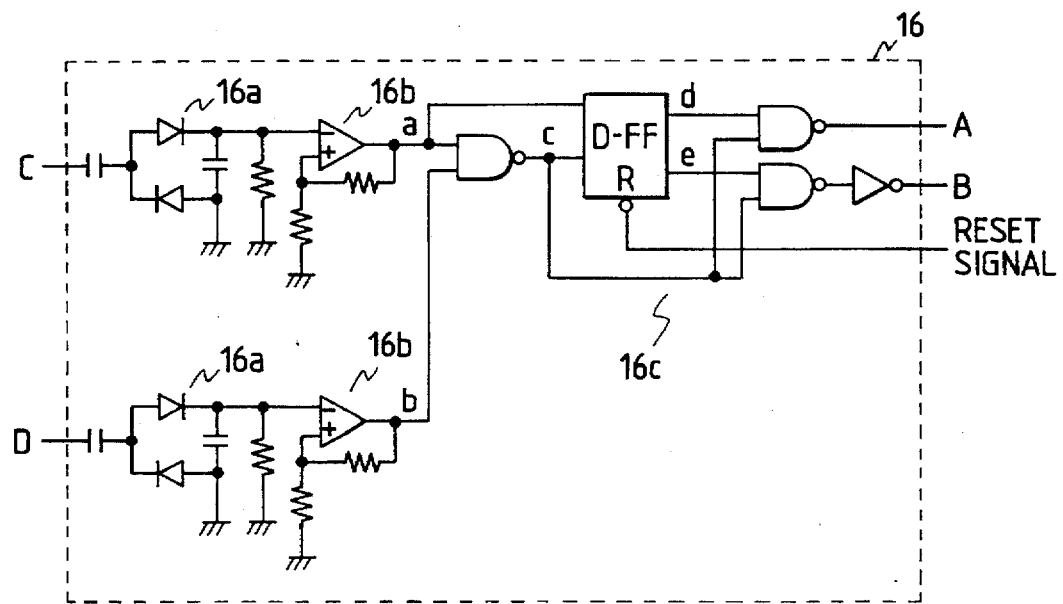
FIG. 4 is a circuit diagram showing an example of the decision circuit in the reader.
Figure 3:
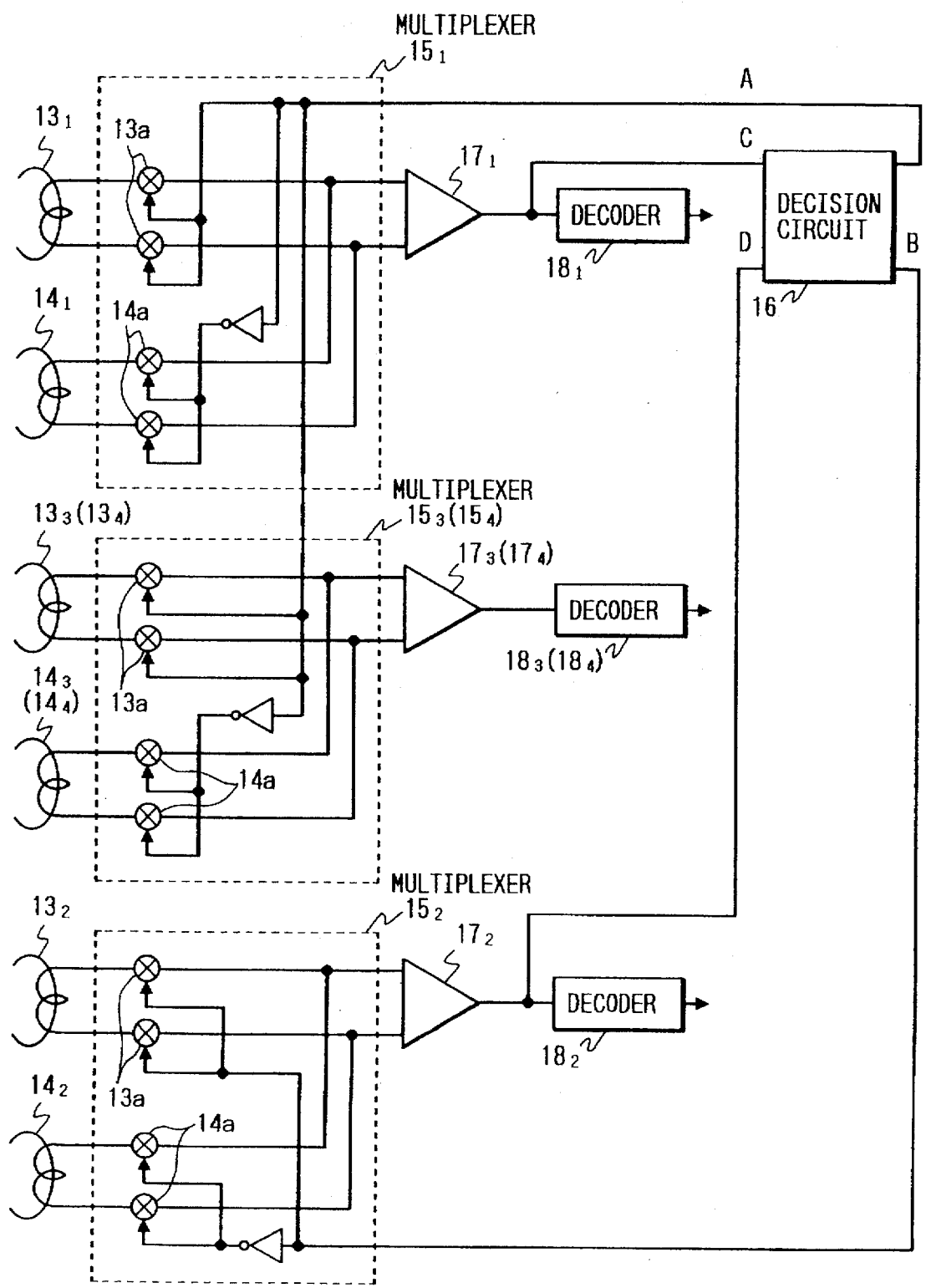
FIG. 3 is a block diagram showing an example of the array of switching circuits in the reader.
Figure 5:
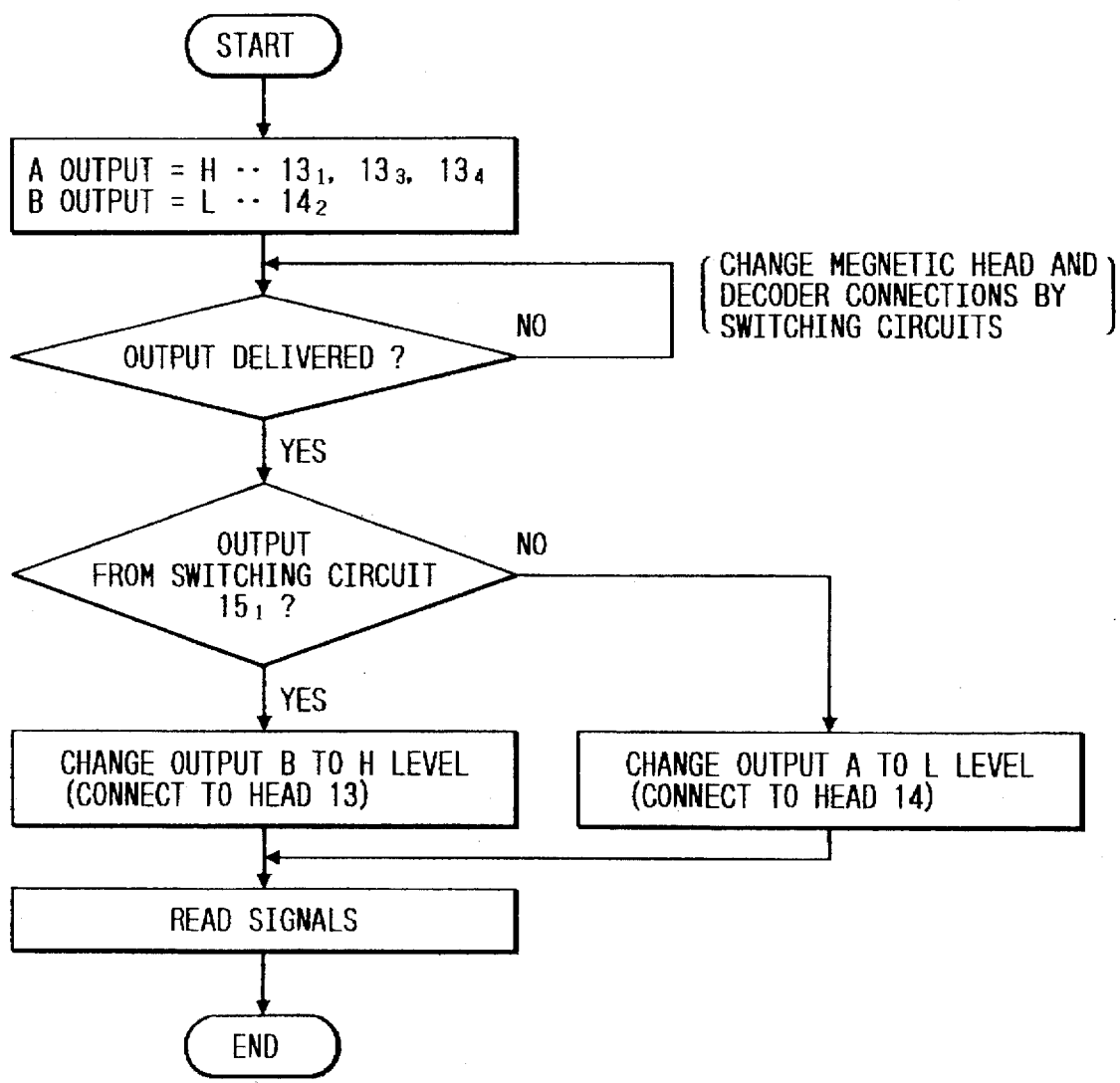
FIG. 5 is a flow chart for processing with the decision circuit.

FIG. 1 is a block diagram of a magnetic card reader according to an embodiment of the present invention and FIG. 2 is a partial view of the reader.

As shown, a magnetic card 11 has a magnetic stripe 12 formed on the surface parallel to the directions of insertion. The magnetic stripe 12 has signals recorded on a plurality of tracks parallel to the directions of insertion. The magnetic card 11, which may be a boarding pass, has signals recorded on four tracks $12_1$ to $12_4$ in the magnetic stripe 12. It should be noted that in all cases the magnetic card 11 has signals encoded on the first track $12_1$ and the second track $12_2$.

Magnetic cards inserted through a slot are transported along a prescribed path by means of a transport system. In the magnetic card reader according to the embodiment under discussion, a four-channel magnetic head 13 is located in a predetermined position for reading signals from tracks $12_1$ to $12_4$ on a magnetic card 11 that is being transported through the path by means of the transport system after insertion in a forward direction. A four-channel magnetic head 14 is located in the same position as the magnetic head 13 with respect to the direction of magnetic card transport for reading signals from tracks $12_1$ to $12_4$ on a magnetic card 11 that is being transported through the path by means of the transport system after insertion in a reverse direction.

The magnetic head 13 is so adapted that in the first channel $13_3$, it reads signals from the first track $12_1$ on the magnetic card 11 that is being transported by means of the transport system after insertion through the slot in a forward direction; in the second channel $13_2$, it reads signals from the second track $12_2$ on the same magnetic card 11; in the third channel $13_3$, it reads signals from the third track $12_3$ on the same magnetic card 11; and in the fourth channel $13_4$, it reads signals from the fourth track $12_4$ on the same magnetic card 11. Similarly, the magnetic head 14 is so adapted that in the first channel $14_1$, it reads signals from the first track $12_1$ on the magnetic card 11 that is being transported by means of the transport system after insertion through the slot in a reverse direction; in the second channel $14_2$, it reads signals from the second track $12_2$ on the same magnetic card 11; in the third channel $14_3$, it reads signals from the third track $12_3$ on the same magnetic card 11; and in the fourth channel $14_4$, it reads signals from the fourth track $12_4$ on the same magnetic card 11.

A switching circuit $15_1$ is supplied with signals as read by the first channel $13_1$ of the magnetic head 13 and signals as read by the first channel $14_1$ of the magnetic head 14 and it selectively outputs these signals in response to a selection signal A from a decision circuit 16. A switching circuit $15_2$ is supplied with signals as read by the second channel $13_2$ of the magnetic head 13 and signal as read by the second channel $14_2$ of the magnetic head 14 and it selectively outputs these signals in response to a selection signal B from the decision circuit 16.

A switching circuit $15_3$ is supplied with signals as read by the third channel $13_3$ of the magnetic head 13 and signals as read by the third channel $14_3$ of the magnetic head 14 and it selectively outputs these signals in response to a selection signal A from the decision circuit 16. A switching circuit $15_4$ is supplied with signals as read by the fourth channel $13_4$ of the magnetic head 13 and signals as read by the fourth channel $14_4$ of the magnetic head 14 and it selectively outputs these signals in response to a selection signal A from the decision circuit 16.

Output signals from the switching circuits $15_1$ to $15_4$ are amplified by amplifier circuits $17_1$ to $17_4$, respectively, and then restored to the original recorded signals by means of decoders $18_1$ to $18_4$. The decision circuit 16 is composed of either a CPU or a charge pump that is to be described later in this specification. On the basis of the output signals from the switching circuits $15_1$ and $15_2$ that have been amplified by amplifier circuits $17_1$ and $17_2$, respectively, the decision circuit 16 determines in which direction, forward or reverse, the magnetic card 11 has been inserted into the slot, and in accordance with the detected direction, the decision circuit 16 outputs selection signal A to switching circuits $15_1$, $15_3$ and $15_4$ or selection signal B to switching circuit $15_2$.

The switching circuits $15_1$ to $15_4$ prior to reading magnetic cards 11 are initialized in such a way that depending on the value of the selection signal A or B is supplied from the decision circuit 16, they select either signals as read by the first channel $13_1$, third channel $13_3$ and fourth channel $13_4$ of the magnetic head 13 or signals as read by the second channel $14_2$ of the magnetic head 14. If the magnetic card 11 is inserted into the slot in a forward direction, the signals as read by the first channel $13_1$ of the magnetic head 13 are obtained earlier than the signals as read by the second channel $13_2$; on the other hand, if the magnetic card 11 is inserted into the slot in a reverse direction, the signals as read by the second channel $14_2$ of the magnetic head 14 are obtained earlier than the signals as read by the first channel $14_1$.

The selection signal A from the decision circuit 16 will not change if it is supplied with the output signals from the switching circuit $15_1$; hence, the decision circuit 16 will cause the switching circuits $15_1$, $15_3$ and $15_4$ to have the signals from the first channel $13_1$, third channel $13_3$ and fourth channel $13_4$ of the magnetic head 13 supplied into the amplifier circuits $17_1$, $17_3$ and $17_4$, respectively; at the same time, selection signal B is reversed and the decision circuit 16 will cause the switching circuit $15_2$ to select the signals from the second channel $13_2$ of the magnetic head 13 so that they are fed into the amplifier circuit $17_2$. If, on other hand, the decision circuit 16 is supplied with the output signals from the switching circuit $15_2$, it will reverse the selection signal A, causing the switching circuits $15_1$, $15_3$ and $15_4$ to select the signals from the first channel $14_1$, third channel $14_3$ and fourth channel $14_4$ of the magnetic head 14 so that they are fed into the amplifier circuits $17_1$, $17_3$ and $17_4$; however, the selection signal B does not change and the decision circuit 16 will cause the switching circuit $15_2$ to have the signals from the second channel $14_2$ of the magnetic head 14 fed into the amplifier circuit $17_2$.

In the embodiment described above, the decision circuit 16 checks the direction of insertion of magnetic card 11 on the basis of the output signals from the switching circuits $15_1$ and $15_2$ in response to timing signals of 4 to 40 bits as supplied from the preamble portion of the magnetic card 11 and the decision circuit 16 permits the switching circuits $15_1$ to $15_4$ to operate selectively depending on the state of selection signals A and B. Thus, the performance of the decision circuit 16 will not cause any adverse effects on the efficiency of reading information from the data portion of the magnetic card 11. It should also be noted that the magnetic card reader in the embodiment under consideration will not function properly if the magnetic card 11 is inserted upside down into the slot.

A specific circuit configuration of the magnetic card reader of the invention and its operation are described below with reference to FIGS. 3 to 6.

Switching circuits $15_1$, $15_2$, $15_3$ and $15_4$ are connected in parallel via two channels of the respective magnetic heads, $13_1/14_1$, $13_2/14_2$, $13_3/14_3$ and $13_4/14_4$, and analog switches 13a and 14a. Depending on the output of the decision circuit 16, either analog switch 13a or 14a is selectively connected to the amplifier circuits $17_1$, $17_2$, $17_3$ and $17_4$.

The output A of the decision circuit 16 is connected to the switching circuits $15_1$, $15_3$ and $15_4$, whereas the output B of the decision circuit 16 is connected to the switching circuit $15_2$.

The output of amplifier $17_1$ is fed into the decoder $18_1$, as well as into the decision circuit 16 as signal C. The output of amplifier $17_2$ is fed into the decoder $18_2$, as well as into the decision circuit 16 as signal D.

The decision circuit 16 has two charge pump 16a and comparator 16b sets connected in parallel; the first charge pump and comparator set is connected to input C, whereas the second set is connected to input D. The respective outputs a, b of the two charge pump and comparator sets are connected to a decision portion 16c that is composed of a D flip-flop circuit and a gate circuit. Stated more specifically, the two outputs a and b are produced to an output c through a NAND gate, which is connected to the clock of a D flip-flop circuit, while output a is connected to the input of the D flip-flop circuit. Output d at the Q-terminal of the D flip-flop circuit and output c are sent to a NAND gate to produce an output A, while output e at the Q-terminal of the D flip-flop circuit and output c are sent to a NAND gate to produce an output B.

The decision circuit 16 will operate in the following manner. First, the D flip-flop circuit is reset, whereupon the output d assumes a low (L) level and the output e assumes a high (H) level. Before a magnetic card is inserted, both inputs C and D are at L level, so both outputs a and b will be at an H level. As a result, output c will assume an L level and output A will assume an H level. In this case, the switching circuits $15_1$, $15_3$ and $15_4$ will operate in such a way that the analog switches 13a associated with the first magnetic head 13 will turn on but the analog switches 14a associated with the second magnetic head 14 will turn off, causing the channels $13_1$, $13_3$ and $13_4$ of the first magnetic head 13 to be connected to the amplifier circuits $17_1$, $17_3$ and $17_4$, respectively.

On the other hand, output B will assume an L level and the switching circuit $15_2$ will operate in such a way that the analog switches 14a associated with the second magnetic head 14 will turn on but the analog switches 13a will turn off, causing the channel $14_2$ of the second magnetic head 14 to be connected to the amplifier circuit $17_2$.

The magnetic card reader, initialized as above, will wait for a magnetic card to be inserted. If a magnetic card 11 is inserted in a forward direction, then when the magnetic stripe 12 reaches the magnetic head 13, the channel $13_1$ of the head will read signals from track $12_1$. Then, the output C from amplifier $17_1$ will make a transition from L to H level, and the charge pump 16a in the decision circuit 16 that is connected to output will be charged so that the level of output a of comparator 16b will change from H to L. As a result, the level of output c will change to H and the decision circuit 16 will sense the delivery of an output. Since the level of output a will have changed from H to L, the decision circuit 16 will conclude that the output has been delivered from the switching circuit $15_1$.

This decision is performed within the decision portion 16c. If a CPU is used as the decision circuit, the procedure will consist of the steps shown in the FIG. 5 flow chart.

If a magnetic card 11 is directed in a forward direction, the magnetic stripe 12 will not reach the second magnetic head 14, so output D will remain unchanged at L level and output b will maintain H level. As a result, output c will assume an H level and, given the L-level output a, outputs d and e of the D flip-flop circuit will remain unchanged (output d is at L level and output e at H-level). Hence, output A of the decision portion 16c will remain at H level but output B will make a transition from L to H level. When output B assumes an H level, the analog switches 13a in the switching circuit $15_2$ will turn on, whereas the analog switches 14a will turn off; as a result, the first magnetic head 13 will be activated but the second magnetic head 14 will remain inactive and the reading of signals from the magnetic stripe 12 having been.

If, with the magnetic card reader having been initialized, a magnetic card 11 is inserted in a reverse direction, then when the magnetic stripe 12 reaches the magnetic head 14, the channel $14_2$ of the head will read the signals from track $12_2$. Then, the output D of amplifier $17_2$ will make a transition from L to H level, and the charge pump 16a in the decision circuit 16 that is connected to output D will be charged so that the level of output b of comparator 16b will change from H to L, whereupon the level of output c will change to H and the decision circuit 16 will sense the delivery of an output. Since the output a remains at an H level, the decision circuit 16 will conclude that the output has been delivered from the switching circuit $15_2$.

If a magnetic card is inserted in a reverse direction, the magnetic stripe 12 will not reach the first magnetic head 13, so output C will remain unchanged (at L level) and output a will maintain the H level. As a result, output c will assume an H level and, given the H-level output a, outputs d and e of the D flip-flop circuit will be inverted (output d will assume H level and output e will assume L level). Hence, output B of the decision portion 16c will remain at L level but output A will make a transition from H to L level. When output A assumes an L level, the analog switches in the switching circuits $15_1$, $15_3$ and $15_4$ will turn off, whereas the analog switches 14a will turn on; as a result, the second magnetic head 14 will be activated but the first magnetic head 13 will remain inactive and the reading of signals from the magnetic stripe 12 will begin.

In the embodiment described above, two magnetic heads 13 and 14 are used and the signals as read by the respective channels of these heads are switched for each set of common channels by means of switching circuits $15_1$ to to be $15_4$, and then amplified by amplifier circuits $17_1$ to $17_4$. Because of these features, the circuit configuration of the magnetic card reader is simple and yet, it is capable of functioning properly irrespective of whether the magnetic card 11 is inserted in a forward or reverse direction; as a further advantage, the reader does not require any sensor for identifying the direction in which individual magnetic cards 11 are inserted.

In the the embodiment, each of the magnetic heads 13 and 14 has four channels but is should be noted that the concept of the present invention is effective as long as these heads have at least two channels. It should also be noted that although the decision circuit 16 may be supplied with the outputs of the switching circuits $15_1$ and $15_2$, supplying the outputs of amplifiers $17_1$ and $17_2$ will be more effective in assuring correct decision results, since larger signals can be produced.

As described on the foregoing pages, the present invention provides a magnetic card reader that has a first multi-channel magnetic head for reading signals from a magnetic card that is inserted in a forward direction and a second multi-channel magnetic head for reading signals from a magnetic head that is inserted in a reverse. The magnetic card reader is capable of reproducing the signals from the magnetic cards irrespective of the direction in which they have been inserted, and the reader is further characterized by including a plurality of switching circuits with which the signals for the respective channels as read by and supplied from said first multi-channel magnetic head and said second multi-channel magnetic head are delivered, after being switched for each set of common channels; a plurality of amplifier circuits for amplifying the respective output signals from said plurality of switching circuits; and a decision circuit that determines the direction of insertion of the magnetic cards on the basis of the output signals from said switching circuits. The reader thereby, selectively operates these switching circuits so as to deliver output signals associated with the direction of insertion of the magnetic cards. Having these features, the reader is simple in circuit configuration and, yet, is capable of proper functioning irrespective of whether magnetic cards are inserted in a forward or reverse direction.

What is claimed is:

1. A magnetic card reader comprising:
   a first multi-channel magnetic head for reading signals from a magnetic card only when said card is inserted in a first direction;
   a second multi-channel magnetic head for reading signals from a magnetic card only when said card is inserted in a second direction;
   a plurality of switching circuits for transmitting a plurality of selected switched signals, wherein each switching circuit receives signals applied from a common channel of said first and said second multi-channel magnetic heads and transmits an appropriate selected switched signal therefrom based upon a selection signal applied thereto;
   a plurality of amplifier circuits for amplifying said plurality of selected switched signals to provide a plurality of amplified output signals; and a decision circuit for determining the direction of insertion of said magnetic card and for producing said selection signal on the basis of one or more of said amplified output signals, thereby selectively operating said switching circuits to produce said selected switched signals based upon the direction of insertion of said magnetic card.

2. A magnetic card reader as claimed in claim 1, wherein the direction of insertion of said magnetic card is determined on the basis of the output signals from a first and a second of said amplifier circuits.

3. A magnetic card reader as claimed in any of claims 1 and 2, wherein said switching circuits comprise multiplexers which use analog switches.

4. A magnetic card reader as claimed in any of claims 1 and 2, wherein each of said multichannel magnetic heads has four magnetic channels, wherein said plurality of switching circuits consists of four switching circuits respectively connected to said four magnetic channels, wherein a first output of said decision circuit is connected to three of said four switching circuits, and wherein a second output of said decision circuit is connected to the remaining switching circuit.

5. A magnetic card reader as claimed in claim 4, wherein three of said switching circuits operate in association with said first magnetic head and the remaining switching circuit operates in association with said second magnetic head.

6. A magnetic card reader as claimed in claim 1, wherein said decision circuit further comprises:

a pair of charge pumps and comparators for detecting a signal of the amplifier circuit, said charge pumps and comparators connected to said amplifier circuits, respectively; and a decision portion for determining the signal associated with one of the amplifier circuits.

7. A magnetic card reader as claimed in claim 6, wherein said decision portion includes a D flip-flop circuit and a gate circuit.

8. A magnetic card reader as claimed in claim 1, wherein the decision circuit is a CPU.

9. A magnetic card reader comprising:

a first multi-channel magnetic head for reading signals from a magnetic card which is inserted in a first direction;

a second multi-channel magnetic head for reading signals from a magnetic card which is inserted in a second direction;

a plurality of switching circuits, wherein each switching circuit receives a first signal from said first multi-channel magnetic head and a second signal from said second multi-channel magnetic head and switches therebetween based upon a selection signal applied thereto;

a plurality of amplifier circuits producing one or more amplified signals, wherein each amplifier receives a switching circuit signal applied thereto from one of said switching circuits and amplifies said selected signal to produce one of said amplified signals;

a decision circuit receiving first and second amplified signals applied from two of said amplifier circuits, wherein said decision circuit provides said selection signal based upon said first and second amplified signals.

10. A magnetic card reader as claimed in claim 9, further comprising a plurality of decoders for decoding said amplified signals.

11. A magnetic card reader as claimed in claim 10, wherein each decoder decodes information corresponding to a single channel of magnetic card data.

12. A magnetic card reader as claimed in claim 9, wherein said decision circuit comprises a central processing unit.

13. A magnetic card reader as claimed in claim 9, wherein said decision circuit comprises a charge pump device.

14. A magnetic card reader as claimed in claim 9, wherein a first, third, and fourth of said switching circuits receives a first selection signal, while a second switching circuit receives a second selection signal.

15. A magnetic card reader as claimed in claim 14, wherein said decision circuit comprises a central processing unit.

16. A magnetic card reader as claimed in claim 14, wherein said charge pump device further comprises a plurality of charge pumps and comparators for detecting at least two of said amplified signals and producing therefrom said first and said second selection signals.

17. A magnetic card reader as claimed in claim 14, wherein said first, third, and fourth switching circuits operate in association with said first magnetic head, and said second switching circuit operates in association with said second magnetic head.

18. A magnetic card reader as claimed in claim 14, wherein said first switching circuit switches between a first channel signal of said first magnetic head and a first channel signal of said second magnetic head, wherein said second switching circuit switches between a second channel signal of said first magnetic head and a second channel signal of said second magnetic head, wherein said third switching circuit switches between a third channel signal of said first magnetic head and a third channel signal of said second magnetic head, wherein said fourth switching circuit switches between a fourth channel signal of said first magnetic head and a fourth channel signal of said second magnetic head.

* * * * *